(12) United States Patent
Bulja et al.

(10) Patent No.: US 10,732,476 B2
(45) Date of Patent: Aug. 4, 2020

(54) ELECTROCHROMIC CELL

(71) Applicant: NOKIA SOLUTIONS AND NETWORKS OY, Espoo (FI)

(72) Inventors: Senad Bulja, Dublin (IE); Rose Kopf, Greenbrook, NJ (US); Florian Pivit, Lucan (IE); Wolfgang Templ, Sersheim (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 75 days.

(21) Appl. No.: 15/978,370

(22) Filed: May 14, 2018

(65) Prior Publication Data

US 2019/0346730 A1   Nov. 14, 2019

(51) Int. Cl.
| | |
|---|---|
| *G02F 1/15* | (2019.01) |
| *G02F 1/1523* | (2019.01) |
| *G02F 1/153* | (2006.01) |
| *G02F 1/155* | (2006.01) |

(52) U.S. Cl.
CPC .......... *G02F 1/1523* (2013.01); *G02F 1/155* (2013.01); *G02F 1/1533* (2013.01); *G02F 2001/1536* (2013.01)

(58) Field of Classification Search
CPC ...... G02F 1/1523; G02F 1/1533; G02F 1/155; G02F 2001/1536
USPC .................................................. 359/265–275
See application file for complete search history.

(56) References Cited

U.S. PATENT DOCUMENTS

| | | | |
|---|---|---|---|
| 6,277,523 | B1 | 8/2001 | Giron |
| 6,420,071 | B1 | 7/2002 | Lee et al. |
| 7,460,289 | B2 | 12/2008 | Pichot et al. |
| 7,609,433 | B2 | 10/2009 | Nguyen |
| 9,377,663 | B2 | 6/2016 | Choi et al. |
| 2004/0021927 | A1 | 2/2004 | Milne et al. |
| 2007/0139756 | A1* | 6/2007 | Agrawal ............... G02F 1/15 359/265 |
| 2009/0323155 | A1 | 12/2009 | Phillips |
| 2010/0079844 | A1 | 4/2010 | Kurman |

(Continued)

FOREIGN PATENT DOCUMENTS

WO   WO2004017134   2/2004

OTHER PUBLICATIONS

Mecerreyes, D. et al; A Simplified all-polymer flexible electrochromic device; Science Direct; Electrochimica Acta 49 (2004) pp. 3555-3559; Elsevier; doi:10.1016/j.electacta.2004.03.032.

(Continued)

*Primary Examiner* — William Choi
(74) *Attorney, Agent, or Firm* — McCracken & Gillen LLC

(57) ABSTRACT

An electrochromic (EC) cell having improved dielectric tunability and lower dielectric losses is disclosed. A multi-layer structure includes at least one electrochromic layer of a transition metal oxide between electrode layers. Two electrolyte layers are located on either side of the at least one electrochromic layer and next to the electrode layers. An ion storage film layer of a transition metal oxide may be provided between the electrochromic layer and one of the electrolyte layers. This structure prevents the shortening of the channel height when a voltage is applied therefore reducing dielectric losses.

20 Claims, 4 Drawing Sheets

(56) References Cited

U.S. PATENT DOCUMENTS

2015/0198856 A1    7/2015  Lee et al.

OTHER PUBLICATIONS

Bulja, S. et al; High Frequency Dielectric Characteristics of Electrochromic, WO 3 and NiO Films with LiNbO 3 Electrolyte; Scientific Reports; 6:28839; DOI:10.1038/srep28839; pp. 1-8; 2016.
Bulja, S. et al; Tuneable Dielectric and Optical Characteristics of Tailor-made inorganic electro-chromic materials; Scientific Reports; 7:13484; DOI:10.1038/s41598-017-13941-9; pp. 1-8; 2017.
Extended European Search Report in related European Application No. 19174036.4, dated Aug. 1, 2019, 11 pages.

\* cited by examiner

ELECTROCHROMIC CELL

TECHNICAL FIELD

Various example embodiments relate generally to electrochromic (EC) cells and more particularly to improved dielectric tunability for an EC cell.

BACKGROUND

Electrochromic materials are materials that allow their optical and/or electrical properties to be controlled by applying a voltage. An example of a use of electrochromic materials is in electrochromic devices such as windows and mirrors, where the application of a voltage to one or more layers of EC material sandwiched between electrodes changes the transmission or reflection properties, and/or the electrical properties, of the device.

SUMMARY

Example embodiments encompass an electrochromic (EC) cell having improved dielectric tunability and lower dielectric losses. In an embodiment, the EC cell is a multi-layer electrochromic structure having a top electrode layer; a bottom electrode layer; a least one electrochromic layer between the top and bottom layers; a first electrolyte layer between the at least one electrochromic layer and the top layer; and a second electrolyte layer between the at least one electrochromic layer and the bottom layer.

In another embodiment, a mm-wave device with tunable capacitance includes a top electrode layer; a bottom electrode layer; a least one electrochromic layer between the top and bottom layers; a first electrolyte layer between the at least one electrochromic layer and the top layer; a second electrolyte layer between the at least one electrochromic layer and the bottom layer; and a voltage source for applying a voltage between the top electrode layer and the bottom electrode layer.

In either of the above embodiments, the at least one electrochromic layer includes an electrochromic film layer and an ion storage film layer wherein the electrochromic film layer is between the second electrolyte layer and the ion storage film layer.

In any of the above embodiments, the electrochromic film layer and the ion storage film layer further comprise transition metal oxides and the electrochromic film layer is selected from the group consisting of tungsten tri-oxide ($WO_3$), titanium oxide ($TiO_2$), molybdenum trioxide ($MoO_3$), tantalum oxide ($Ta_2O_5$) and niobium pentoxide ($Nb_2O_5$) while the ion storage film layer is selected from the group consisting of nickel oxide (NiO), chromium oxide ($Cr_2O_3$), manganese oxide ($MnO_2$), iron oxide ($FeO_2$), cobalt oxide ($CoO_2$), rhodium oxide ($RhO_2$) and iridium oxide ($IrO_2$).

In an embodiment, the electrochromic file layer is tungsten tri-oxide ($WO_3$) and the ion storage film layer comprises nickel oxide (NiO).

In any of the above embodiments, the electrolyte layers are an electrolyte displaying different ion and electron conductivities, for example, lithium niobate ($LiNbO_3$).

In any of the above embodiments, the electrochromic film layer, the ion storage film layer and the first and second electrolyte layers have thicknesses between 50 nm and 1 micron.

DESCRIPTION OF THE DRAWINGS

Some example embodiments will now be described with reference to the accompanying drawings in which.

DETAILED DESCRIPTION

Electrochromic (EC) materials are materials that allow their optical and/or electrical properties to be controlled by applying a voltage. EC materials are often used as one of the layers in a multi-layer structure known as an electrochromic (EC) cell. Various characteristics of an EC cell may be engineered to tailor the EC cell for a variety of applications without changing its material composition.

Figure 1A:
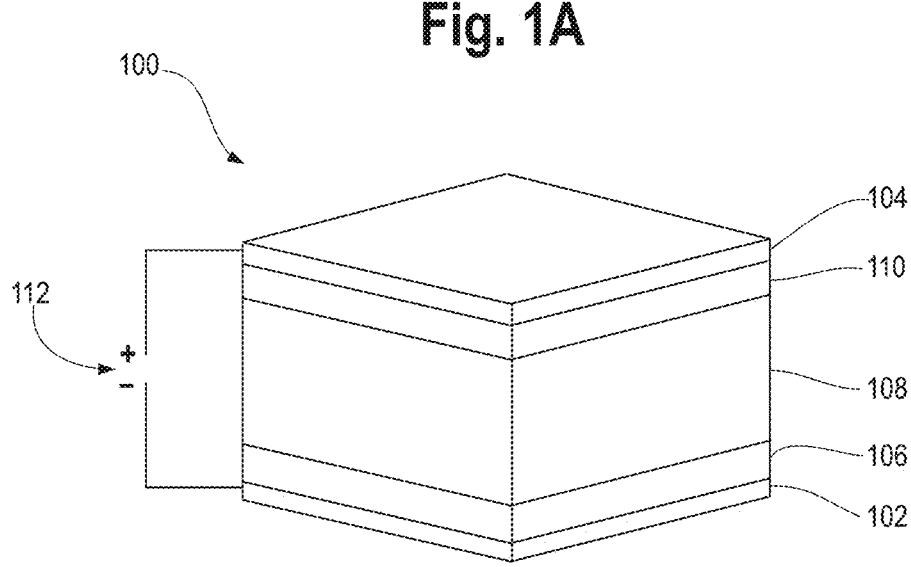
FIGS. 1A and 1B show perspective views of electrochromic (EC) cells.

An embodiment of an EC cell 100 is shown in FIG. 1A. Glass (not shown) may be used as a substrate on which is formed several layers. These layers include two conducting layers 102 and 104, at least one EC layer 106, for example, a transition metal oxide, adjacent to conducting layer 102 and an ion-conducting or electrolyte layer 108 between EC layer 106 and either the other conducting layer 104 or a second EC layer 110. In an embodiment, layer 108 is lithium niobate ($LiNbO_3$), although any electrolyte displaying different ion and electron conductivities, typically $\sigma_i > 10^{-7}$ S/cm for ions and $\sigma_e < 10^{-10}$ S/cm for electrons, may be used.

In an embodiment, layers 102 and 104 are conductors, for example, gold, indium tin oxide (ITO), zinc oxide (ZnO), a conductive polymer or any material that is a good electrical conductor. Layer 106 is a chromic film, for example, tungsten tri-oxide ($WO_3$), however, a variety of other transition metal oxides may be used, such as titanium oxide ($TiO_2$), molybdenum trioxide ($MoO_3$), tantalum oxide ($Ta_2O_5$) or niobium pentoxide ($Nb_2O_5$). Layer 110 is another chromic film, also understood as an ion storage film, chosen to have complementary electrochromic characteristics to chromic film layer 106. Layer 110 may be, for example, nickel oxide (NiO), although a variety of other transition metal oxides, such as chromium oxide ($Cr_2O_3$), manganese oxide ($MnO_2$), iron oxide ($FeO_2$), cobalt oxide ($CoO_2$), rhodium oxide ($RhO_2$) or iridium oxide ($IrO_2$).

EC cell 100 is actuated by applying a voltage to conductive layers 102 and 104. This voltage is provided by, for example, voltage source 112. In a non-actuated state, EC layers 106 and 110 are non-conductive and behave as insulators. Electrolyte layer 108 is non-conductive in both actuated and non-actuated states. Upon application of a DC bias voltage between conducting layers 102 and 104, ions from electrolyte layer 108 are expelled and subsequently injected into the one or more EC layers 106 and 110 through a process of intercalation, which changes the fundamental characteristics of the EC layers.

Figure 1B:
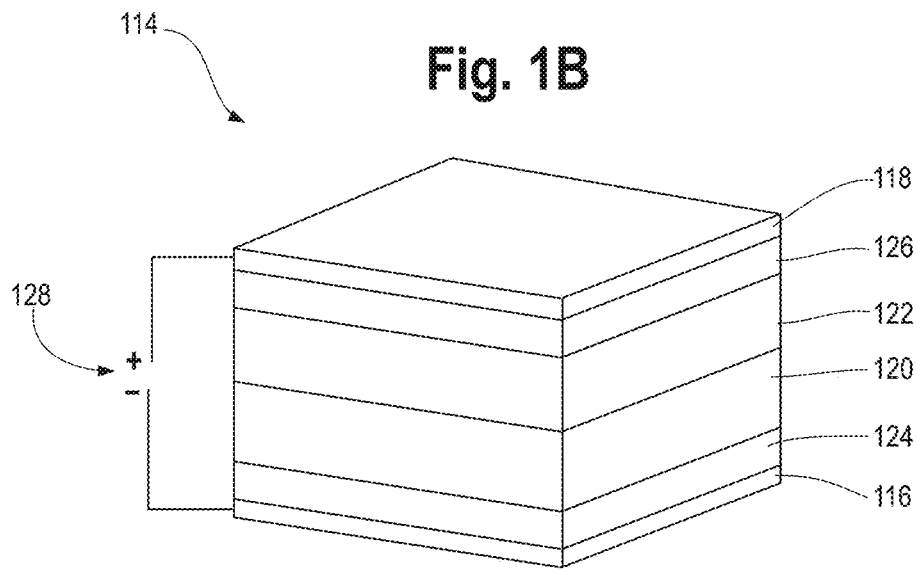

FIG. 1B illustrates another embodiment of an electrochromic (EC) cell at 114. Top and bottom layers 116 and 118 are conductors, for example, gold, indium tin oxide (ITO), zinc oxide (ZnO), a conductive polymer or any material that is a good electrical conductor. Layer 120 is a chromic film, for example, tungsten tri-oxide ($WO_3$), however, a variety of other transition metal oxides may be used, such as titanium oxide ($TiO_2$), molybdenum trioxide ($MoO_3$), tantalum oxide ($Ta_2O_5$) or niobium pentoxide ($Nb_2O_5$). Layer 122 is another chromic film, also understood as an ion storage film, chosen to have complementary electrochromic characteristics to chromic film layer 120. Layer 122 may be, for example, nickel oxide (NiO), although a variety of other transition metal oxides, such as chromium oxide ($Cr_2O_3$), manganese oxide ($MnO_2$), iron oxide ($FeO_2$), cobalt oxide ($CoO_2$), rhodium oxide ($RhO_2$) or iridium oxide ($IrO_2$). In an alternative embodiment of EC cell 114, layer 122 is not present.

Layers 124 and 126 are ion-conducting layers, for example, an electrolyte. In an embodiment, layers 124 and 126 are lithium niobate (LiNbO3), although any electrolyte displaying different ion and electron conductivities, typically $\sigma_i > 10^{-7}$ S/cm for ions and $\sigma_\varepsilon < 10^{-10}$ S/cm for electrons, may be used. Layers 124 and 126 serve as a tank for providing available ions to be injected into chromic layers 120 and 122 when a DC bias voltage is applied to bottom layer 116 and top layer 118. This voltage is provided by, for example, voltage source 128. Layers 124 and 126 may both be formed from the same or different electrolyte materials.

Depending on the application, EC cell 114 of FIG. 1B may also include one or more substrates, not shown for conciseness. These substrates may be glass, for example, but any structurally stable substrates may be used.

Figure 2A:
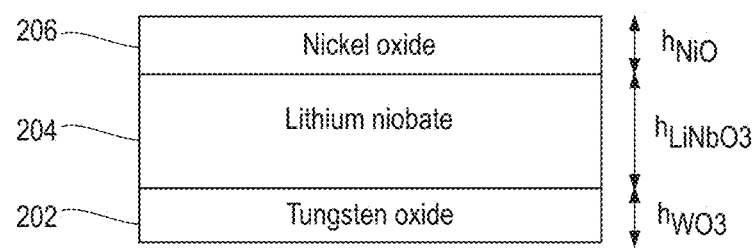
FIGS. 2A and 2B depict cross-sectional diagrams of EC cell layers of the EC cells of FIGS. 1A and 1B, respectively.
Figure 2B:
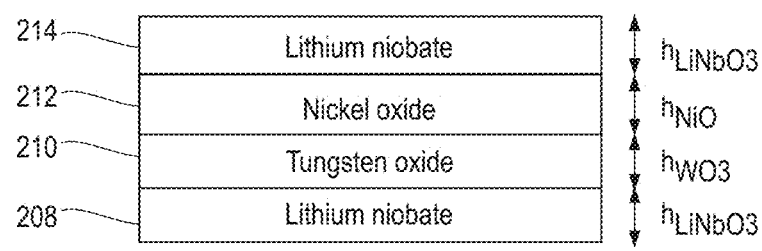

In order to explain the operation of EC cells 100 and 114 of FIGS. 1A and 1B, the diagrams of FIGS. 2A and 2B are provided. FIG. 2A depicts a cross-sectional view of internal layers of EC cell 100 as shown in FIG. 1A. Although specific materials are shown, one of ordinary skill in the art would understand that the following discussion applies to any of the alternative materials for these layers as described above. In FIG. 2A, an ion-conducting or electrolyte layer 204 of $LiNbO_3$ is sandwiched between an EC film layer 202 of $WO_3$ and an ion storage film layer 206 of NiO. The total height of the layers without DC bias voltage applied to external electrodes (not shown) attached at the top and bottom of the layers 202 and 206 is given by $h_{0v} = h_{WO3} + h_{LiNbO3} + h_{NiO}$. However, when the DC bias voltage is applied, ions from layer 204 intercalate into layers 202 and 206, resulting in their transition from insulators to relatively poor conductors with a resistivity of up to approximately $3 \cdot 10^{-3}$ (cm), for values of x~0.5 in in $Li_xWO_3$. As a result, from the point of view of the external electrodes, the chromic layers effectively become part of the external electrodes and the channel height of the EC cell becomes approximately $h_{Vmax} = h_{LiNbO3}$.

FIG. 2B depicts a cross-sectional view of internal layers of EC cell 114 of FIG. 1B. In this EC cell, EC film layer 210 of $WO_3$ and an ion storage film layer 212 of NiO have been moved away from the external electrodes (not shown) into the interior of the EC cell. An ion-conducting or electrolyte layer is split into two layers 208 and 214 on either side of layers 210 and 212 at the point of contact with the external electrodes. Since the electrolyte does not exhibit a dielectric to metal transition by losing ions, the effective height of the EC cell remains the same at both 0V and $V_{max}$ as $h = h_{LiNbO3} + h_{WO3} + h_{NiO} + h_{LiNbO3}$. This provides a greater degree of dielectric tunability and lower dielectric losses, since the channel height is not shortened.

As described above, when a voltage is applied across EC cells 100 or 114, ions from the electrolyte layer or layers intercalate into the chromic layers. The net effect of ion intercalation and de-intercalation is macroscopically observed as modulation of the dielectric characteristics of the EC cell, in particular, its dielectric constant, or relative permittivity, and its loss tangents. This modulation provides for tailoring the dielectric and the optical characteristics of the EC cells of FIGS. 1A and 1B for a variety of applications.

Figure 3A:
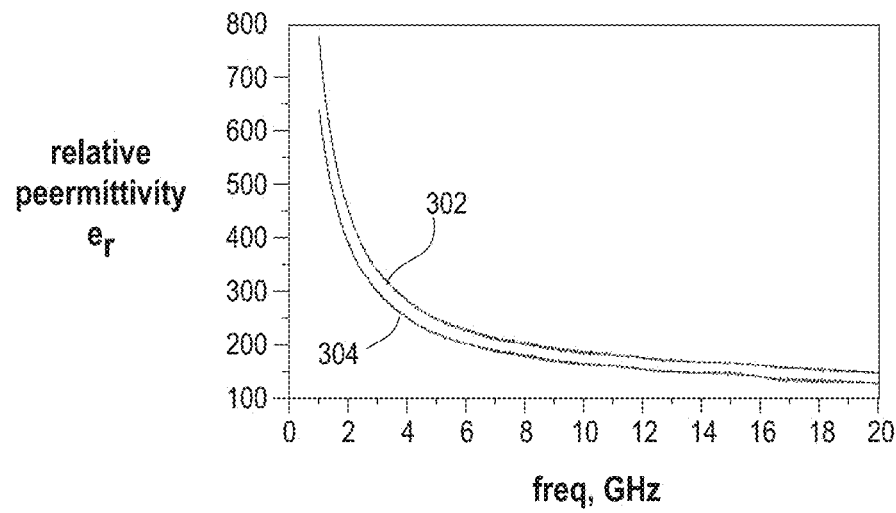
FIGS. 3A and 3B depict dielectric permittivity at 0V and 4V, respectively, for the EC cell of FIG. 2A.
Figure 3B:
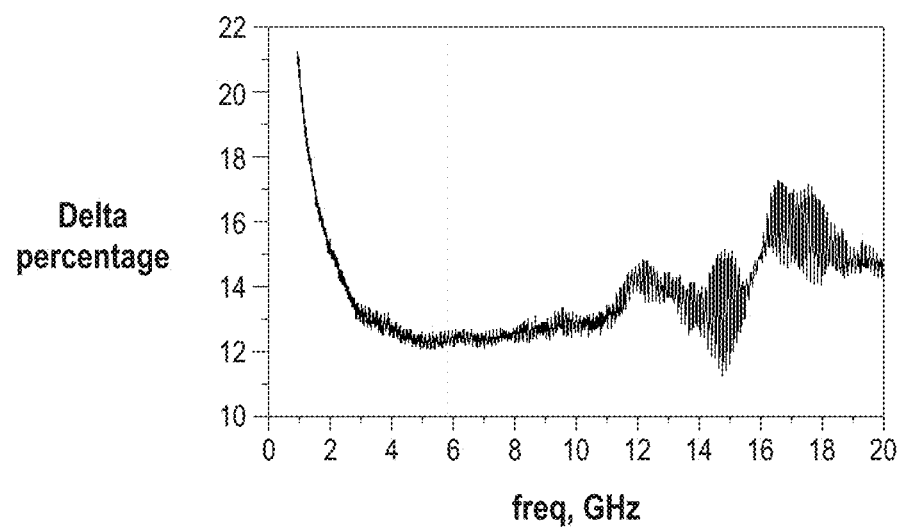

FIG. 3A depicts the relative permittivity $\varepsilon_r$ vs. frequency in GHz of the EC cell of FIG. 2A. In an actuated state (DC bias voltage=4V), $\varepsilon_r$ is shown as curve 302 and in a non-actuated state (DC bias voltage=0V) $\varepsilon_r$ is shown as curve 304. FIG. 3B shows the percentage dielectric tunability for the curves of FIG. 3A. In an example embodiment of this EC cell, the thicknesses of the individual layers are $h_{LiNbO3} = 700$ nm, the $h_{WO3} = 130$ nm and $h_{NiO} = 140$ nm. Although specific thicknesses are shown for the purposes of illustration, all three layers of the EC cell of FIG. 2A may vary between approximately 50 nm and 1 micron. As is evident from FIG. 3B, the EC cell of FIG. 2A achieves a dielectric tunability pf approximately 11%.

Figure 4A:
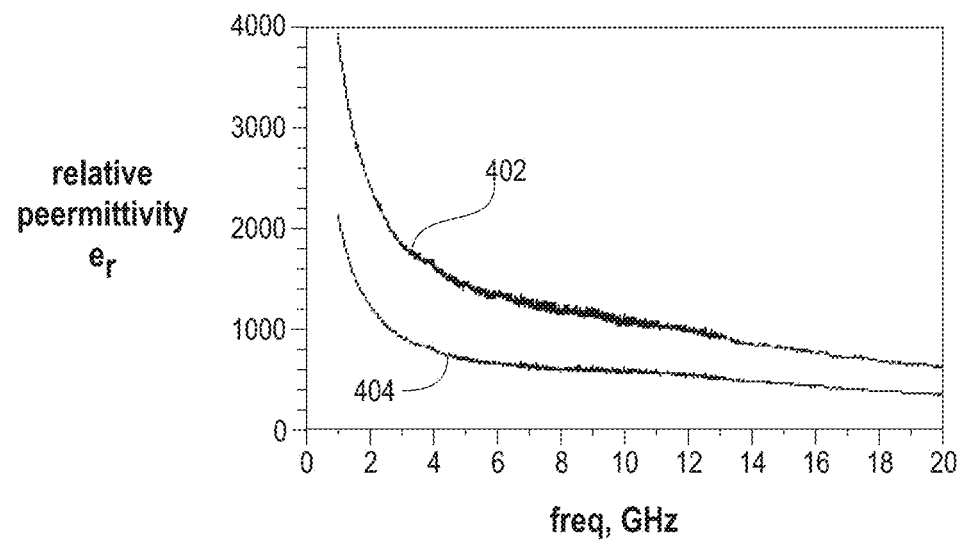
FIGS. 4A and 4B depict dielectric permittivity at 0V and 4V, respectively, for the EC cell of FIG. 2B.
Figure 4B:
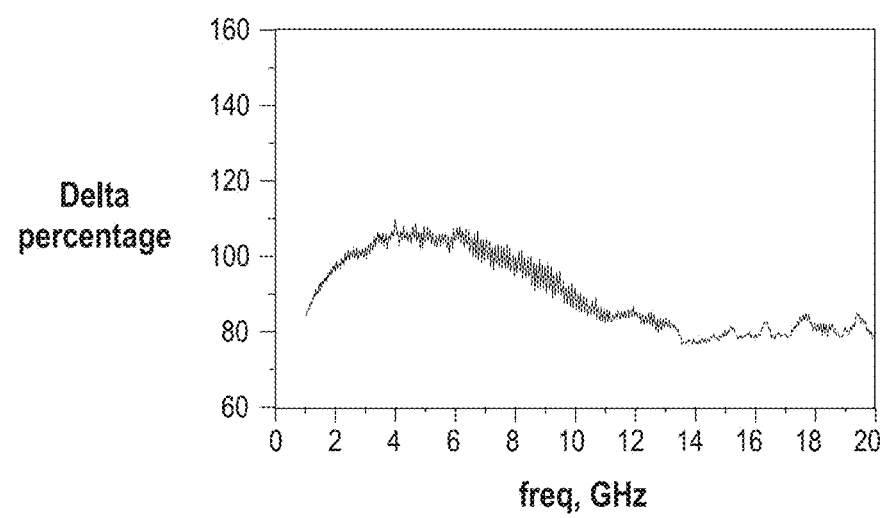

FIG. 4A depicts the relative permittivity $\varepsilon_r$ vs. frequency in GHz of the EC cell of FIG. 2B. FIG. 4A shows permittivity when the EC cell is in an actuated state (DC bias voltage=4V) as curve 402 and a non-actuated state (DC bias voltage=0V) as curve 404. FIG. 4B shows the percentage dielectric tunability for the curves of FIG. 4A. In an example embodiment of this EC cell, the thicknesses of the individual layers are $h_{LiNbO3} = 150$ nm and $h_{WO3} = 140$ nm. Although specific thicknesses are shown for the purposes of illustration, all four layers of the EC cell of FIG. 2B may vary between approximately 50 nm and 1 micron. As is evident from FIGS. 4A and 4B, EC cell 114 achieves a dielectric tunability of no less than 78%.

With regard to FIGS. 3A, 3B, 4A and 4B, although these figures depict example embodiments of a DC bias voltage of 4V, any voltage up to approximately 10 V may be used. The DC bias voltage depends on a number of factors, including thickness of the layers in the EC cell.

Each of the layers in an EC cell exhibits a capacitance, with the total equivalent capacitance of the EC cell related to the sum of the capacitances of the constituent layers. The capacitance of each layer is proportional to the dielectric permittivity. By modulating the dielectric permittivity, it is possible to change the operational characteristics of the EC cell. Thus, the EC cells described above have many applications in both the MM-wave and optical domains, for example, displays with a tailor-made optical response and beam-forming function as well as tunable optical and microwave devices, such as phase shifters, switches, attenuators and antennas.

An EC cell as described above may be fabricated using a variety of semiconductor device manufacturing processes including, for example, chemical vapor deposition (CVD) and reactive-ion etching (ME).

If used and unless otherwise stated, the terms "upper," "lower," "front," "back," "over," "under," and similar such terms are not to be construed as limiting embodiments to a particular orientation. Instead, these terms are used only on a relative basis.

What is claimed is:

1. A multi-layer electrochromic structure comprising:
a top electrode layer;
a bottom electrode layer;
at least one electrochromic layer between the top and bottom layers;
a first electrolyte layer between the at least one electrochromic layer and the top layer; and
a second electrolyte layer between the at least one electrochromic layer and the bottom layer, wherein the first electrolyte layer is at a point of contact with the top electrode layer, and the second electrolyte layer is at a point of contact with the bottom electrode layer.

2. The multi-layer electrochromic structure of claim 1, wherein the at least one electrochromic layer further comprises an electrochromic film layer and an ion storage film layer.

3. The multi-layer electrochromic structure of claim 2, wherein the electrochromic film layer is between the second electrolyte layer and the ion storage film layer.

4. The multi-layer electrochromic structure of claim 2, wherein the electrochromic film layer and the ion storage film layer further comprise transition metal oxides.

5. The multi-layer electrochromic structure of claim 4, wherein the electrochromic film layer comprises a transition metal oxide selected from the group consisting of tungsten tri-oxide ($WO_3$), titanium oxide ($TiO_2$), molybdenum trioxide ($MoO_3$), tantalum oxide ($Ta_2O_5$) and niobium pentoxide ($Nb_2O_5$).

6. The multi-layer electrochromic structure of claim 4, wherein the electrochromic film layer comprises tungsten oxide ($WO_3$).

7. The multi-layer electrochromic structure of claim 4, wherein the ion storage film layer comprises a transition metal oxide selected from the group consisting of nickel oxide (NiO), chromium oxide ($Cr_2O_3$), manganese oxide ($MnO_2$), iron oxide ($FeO_2$), cobalt oxide ($CoO_2$), rhodium oxide ($RhO_2$) and iridium oxide ($IrO_2$).

8. The multi-layer electrochromic structure of claim 4, wherein the ion storage film layer comprises nickel oxide (NiO).

9. The multi-layer electrochromic structure of claim 2, wherein the electrochromic film layer and the ion storage film layer have thicknesses between 50 nm and 1 micron.

10. The multi-layer electrochromic structure of claim 1, wherein the electrolyte layers comprise an electrolyte displaying different ion and electron conductivities.

11. The multi-layer electrochromic structure of claim 10, wherein the first and second electrolyte layers comprise lithium niobate ($LiNbO_3$).

12. The multi-layer electrochromic structure of claim 1, wherein the first and second electrolyte layers have thicknesses between 50 nm and 1 micron.

13. A mm-wave device with tunable capacitance, comprising:
    a top electrode layer;
    a bottom electrode layer;
    at least one electrochromic layer between the top and bottom layers;
    a first electrolyte layer between the at least one electrochromic layer and the top layer;
    a second electrolyte layer between the at least one electrochromic layer and the bottom layer, wherein the first electrolyte layer is at a point of contact with the top electrode layer, and the second electrolyte layer is at a point of contact with the bottom electrode layer; and
    a voltage source for applying a voltage between the top electrode layer and the bottom electrode layer.

14. The mm-wave device of claim 13, wherein the at least one electrochromic layer further comprises an electrochromic film layer and an ion storage film layer.

15. The mm-wave device of claim 14, wherein the electrochromic film layer is between the second electrolyte layer and the ion storage film layer.

16. The mm-wave device of claim 14, wherein the electrochromic film layer, the ion storage film layer, and the first and second electrolyte layers have thicknesses between 50 nm and 1 micron.

17. The mm-wave device of claim 16, wherein the electrochromic film layer comprises a transition metal oxide selected from the group consisting of tungsten tri-oxide ($WO_3$), titanium oxide ($TiO_2$), molybdenum trioxide ($MoO_3$), tantalum oxide ($Ta_2O_5$) and niobium pentoxide ($Nb_2O_5$).

18. The mm-wave device of claim 16, wherein the ion storage film layer comprises a transition metal oxide selected from the group consisting of nickel oxide (NiO), chromium oxide ($Cr_2O_3$), manganese oxide ($MnO_2$), iron oxide ($FeO_2$), cobalt oxide ($CoO_2$), rhodium oxide ($RhO_2$) and iridium oxide ($IrO_2$).

19. The mm-wave device of claim 13, wherein the electrolyte layers comprise an electrolyte displaying different ion and electron conductivities.

20. The mm-wave device of claim 19, wherein the first and second electrolyte layers are lithium niobate ($LiNbO_3$).

\* \* \* \* \*